Sept. 23, 1924.

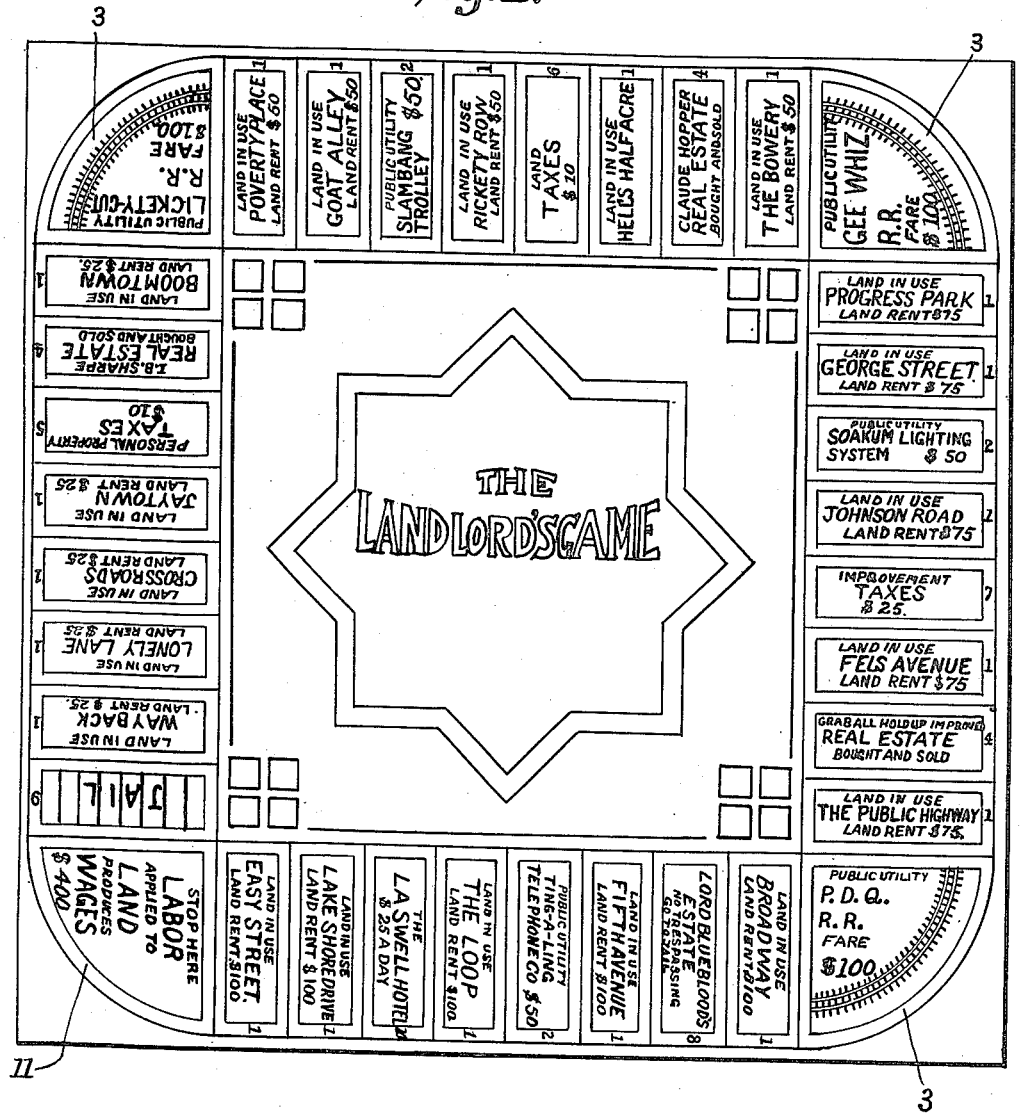

E. M. PHILLIPS

GAME BOARD

Filed April 28, 1923   2 Sheets-Sheet 2

1,509,312

INVENTOR.
Elizabeth Magie Phillips,
BY
ATTORNEYS.

Patented Sept. 23, 1924.

UNITED STATES PATENT OFFICE.

ELIZABETH MAGIE PHILLIPS, OF WASHINGTON, DISTRICT OF COLUMBIA.

GAME BOARD.

Application filed April 28, 1923. Serial No. 635,246.

*To all whom it may concern:*

Be it known that I, ELIZABETH MAGIE PHILLIPS, a citizen of the United States, residing at Washington, in the District of Columbia, have invented certain new and useful Improvements in Game Boards, of which the following is a specification.

My invention, which I call the "Landlord's game," relates to game boards, and more particularly to games of skill and chance, designed also as educational in its nature. It comprises a board which is used in conjunction with dice, cubes, and the like, which indicate the moves to be made by the players.

The object of the game is not only to afford amusement to the players, but to illustrate to them how under the present or prevailing system of land tenure, the landlord has an advantage over other enterprises and also how the single tax would discourage land speculation. The player who first accumulates ($3000) three thousand dollars, in cash, wins the game. The amount, or goal, may be raised, if desired.

In the drawings forming a part of this specification, and in which like symbols of reference represent corresponding parts in the several views:—

Figure 1 is a plan view of the board, showing the various spaces on the same;

Figure 3:
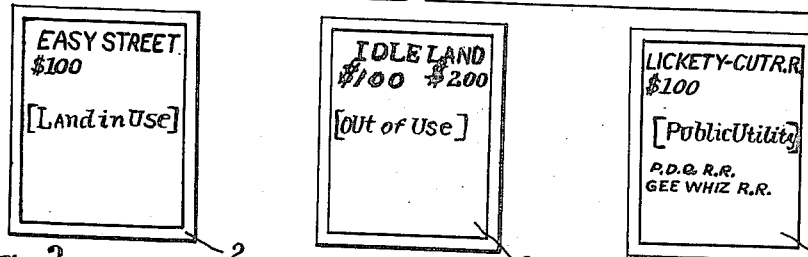
Figure 3 is a view of three of the forty-two cards used.
Figure 2:
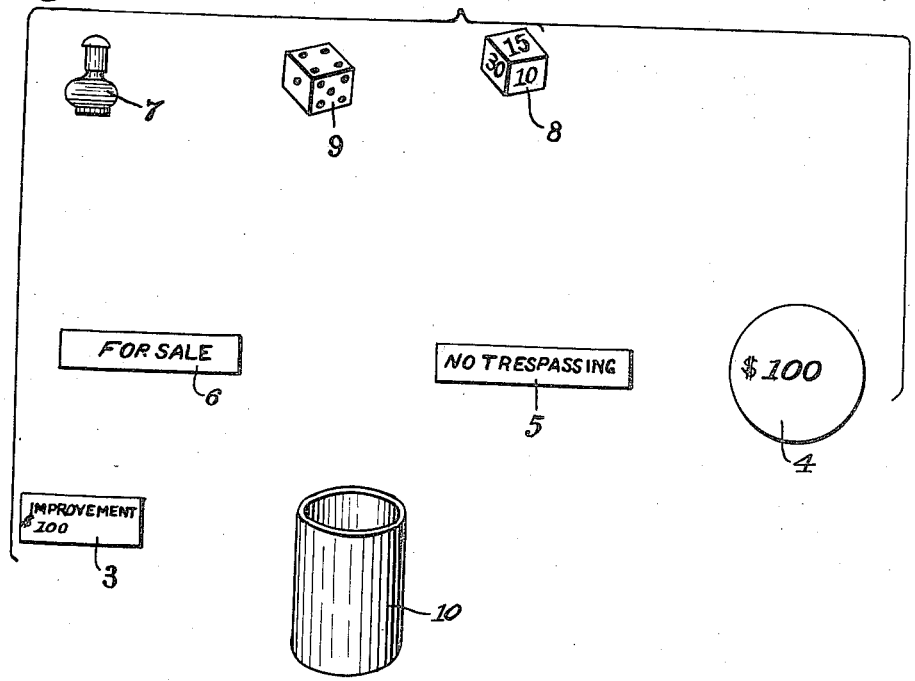
Figure 2 shows the various movable pieces used in the game.

The implements.

The implements consist of a board, which is divided into a number of spaces; a pack of forty-two cards; forty Improvement tags; an assortment of money pieces representing ($6600) six-thousand six-hundred dollars; four No trespassing signs; one For sale sign; four checkers; one chance cube; one pair of dice; and one dice box.

The series of spaces on the board are preferably colored to make them distinctive; but of course other means may, if desired, be employed.

There are twenty green spaces, for which there are twenty corresponding cards, representing land in present use, for which the players pay or receive rents, according to ownership. The three yellow spaces represent real estate offices where land may be bought or sold for speculative purposes.

*Railroads.*—These are the three corner spaces, for which there are three corresponding cards, and represent transportation, for which players make or receive payment, according to ownership.

*Public utilities.*—The three orange spaces, for which there are three corresponding cards, represent public utilities, for which the players make or receive payment according to ownership.

*Taxes.*—The blue spaces represent places where taxes are paid by the players on various kinds of property.

*Lord Blueblood's estate.*—This space represents foreign ownership of American soil, and carries with it a jail penalty for trespassing.

*Jail.*—The jail represents the place of punishment for those who trespass on another's property.

*La Swelle Hotel.*—The space represents the distinction made between classes, only moneyed guests being accepted.

*Wages.*—This space represents the wages received for actual labor.

*Land in use.*—The twenty green cards represent the title deeds, or ownership of the twenty corresponding board spaces representing land in actual use; and the three orange cards represent the ownership of the three corresponding board spaces representing public utilities.

*Idle land.*—The sixteen yellow cards represent land which is held out of use, and which is bought and sold for speculative purposes only. One of the yellow cards represents a gold mine.

*Tags.*—The small, variously colored tags represent improvements which may be made upon the land.

*For sale.*—This sign is to be put on top of any cards that may be on the board for sale.

*No trespassing.*—This sign indicates that no player except the owner may stop on the space on which it is placed.

*Money denominations.*—The money denominations are 8 red pieces, value $500 each, $4000; 17 green pieces, value $100 each, $1700; 13 yellow pieces, value $50 each, $650; 21 blue pieces, value $10 each, $210; and 8 pink pieces, value $5 each, $40; making a total of $6600.

In playing the game the cards are shuffled and dealt out one at a time to the four players until each player has received eight cards. The remainder of the cards are placed in the middle of the board, with the "For sale" sign on the top of the same. Players own the board spaces according to the cards they hold. Yellow cards have no corresponding board spaces.

After the cards are shuffled each player is provided with a checker, one Improvement tag, one No trespassing tag, tags being same color as checker; and $500 in game money pieces. For convenience in making change, take 3 $100 (green), $300; 3 $50 (yellow), $150; 4 $10 (blue), $40; and 2 $5 (pink), $10; making a total of $500.

In the drawings I have designated the cards by the numeral 2; Improvement tags 3; money pieces 4; No trespassing signs 5; For sale sign 6; checkers 7; chance cube 8; dice 9; and dice box 10.

Each player puts his Improvement on any land space owned by himself; all players putting their checkers in the wages corner from which they begin to count. The dice are thrown to determine the first player, high winning. First player then throws his dice and moves along the board to the left, the number of spaces indicated by the dice. Count Jail space 1, Wayback 2, etc., the player following the rule applying to the space upon which he has stopped, the rule number being found in margin of board space.

The object of each player is to be the first to accumulate $3000 and thus win the game. The limit may be raised at the option of the players. The various ways in which the players may obtain money, are from rent, (for land or improvement); railroad fares; public utilities; wages which they receive each time they make a complete round of the board; and from the sale of Idle land cards.

Rules.

1. *Land in use.*—A player stopping on this space is supposed to be occupying and using the land, and pays to the owner thereof the amount of land rent indicated. If there is an "Improvement" on the land, he pays $100 in addition to the land rent. If a player is himself the owner of the space, he takes from the board the amount of rent indicated. If the space is for sale, that is, if the corresponding card is still on the board, all the players bid for it, the highest bidder paying to the board the amount of his bid and taking the card into his hand. If there is a No trespassing sign on the space, a player cannot stop there at all, unless it is his own, but must go to jail, that is, put his checker on the Jail space. If at any time a player has no money, or an insufficient amount to meet his obligations, he must sell one of his cards to one of the other players, getting the best price he can for it. If the proceeds from the sale are still insufficient he must offer other cards for sale until he realizes enough to pay his debts. When a player has no money and no cards he is out of the game.

2. *Local public utility.*—A player on this space pays to the owner the amount indicated, ($50). Or, if he himself holds the franchise card, he takes $50 from the board. If one player owns the three local public utilities Slambang Trolley, Soakum Lighting System, and Ting-a-Ling Telephone Company, he has a Monopoly. In case of a Monopoly the rates are raised to $100 each space.

3. *Railroad.*—A player on this space pays to the owner thereof the amount indicated ($100). Or, if he is himself the owner, he takes that amount from the board. If one player owns the three railroads; he has a Monopoly. In case of a Monopoly the railroad fare in each case is $200. After payment of the railroad fare a player may move to any space he pleases 8 or a less number of spaces either forward or backward.

4. *Real estate office.*—A player on this space may sell to the board any or all of the Idle land cards which he may hold, receiving therefor $200 each, except in the case of the Gold mine card, for which he receives $500. Or, a player may buy one or more Idle land cards from the board, paying therefor $100 each. When buying such cards, if the Gold mine card is among those on the board, the player must draw blindly, after the cards have been shuffled by another player. A player cannot buy and sell in the same turn.

5. *Taxes on personal property.*—A player on this space pays to the board $10 on each $100 in money that he has. If he has less than $100, he is exempt from such taxation.

6. *Taxes on land.*—A player on this space pays to the board $10 on every Land card (green or yellow), that he holds.

7. *Taxes on improvements.*—A player on this space pays to the board $25 on every Improvement tag, every Railroad card (red), and every Public utility card (orange), in his possession.

8. *Lord Blueblood's estate.*—A player on this space is supposed to be trespassing and must go to jail, that is, put his checker on the Jail space.

9. *Jail.*—A player in jail must pay a fine of $50 and throw 6 or more before he may move out.

10. *La Swelle Hotel.*—A player on this space pays to the board $25 if he has in his possession $2,000 or more in cash. If he has not such an amount, he throws his dice again and moves backward.

11. *Wages.*—A player reaching this space stops on it, no matter how many more spots his dice show, and receives from the board $400 in wages. A player reaching this space by exact count of the dice, receives $500 from the board as wages.

*Chance cube.*—When a player throws a double, after moving and completing his transaction as he would on an ordinary throw, he then throws the dice again, including therewith the Chance cube. He moves, completes his transaction as usual, and then does one of the following things;— according to the number shown on the uppermost side of the cube (Note. These may be replaced by other gains or losses at the pleasure of the players. The cube runs from 5 to 30, increasing five points on each side. These indicate the penalty or reward agreed upon.) 5 Caught robbing a hen-roost—go to jail; 10 Caught robbing the public—take $200 from the board. The players will now call you Senator. 15 Draw a card from the cards (if any) left on the board. 20 Take an Improvement tag from the board. 25 Loss by fire. Return to the board your nearest Improvement tag. 30 A judgment against you. Pay $200 to the next player on your left.

Suggestions.

A player may, in his turn, before throwing, buy from the board as many Improvements as he pleases, at the rate of $300 each, and place one each on any of his own (green) land spaces. For each Improvement so placed, he receives $100 rent in addition to the land rent. An Improvement once placed cannot be removed except to change its color according to change in ownership (that is, when sold to another player.)

A player may at any time in his turn put a No trespassing sign on any (green) Land space owned by himself, thus sending any trespassing player to jail. When there are at least four Improvements on any one side of the board, the land rent on that whole side of the board is doubled.

Players may buy from, sell to, or trade cards with each other at any time during the game. Preferably all such transactions should be in the regular turn of one of the players. When a player has business transactions with the board, oftentimes it would avoid confusion, dispute, and playing too soon, if the player next on the left should act as clerk for the one playing.

Having now fully described my invention, what I claim as new, and desire to secure by Letters Patent, is:—

1. A game-board, provided with corner spaces, intervening spaces of different denominations and values, some of the spaces of the different series corresponding and distinguished by coloring or other marking, so that the corresponding divisions may be recognized, a series of cards of changeable value, two or more of which are alike and which relate to two or more certain spaces on the board, and a series of movable pieces to be used in conjunction with the spaces of the board and controlled by dice, so as to determine the play.

2. A game-board, provided with corner spaces, intervening spaces having distinctive markings, some of the intervening spaces corresponding with each other, movable and interchangeable pieces which may be used in combination with the board and with each other, dice, and a cube to be used in combination with the dice and with the board, said cube having upon its faces symbols to indicate a condition or a move.

3. A game-board, provided with intervening spaces of different denominations and values and distinguished by suitable marking, dice, cards representing franchises, title to land in use and to land held out of use, improvement tags, checkers, and a chance cube to be used with the dice and with the board.

4. A game-board, provided with corner spaces, intervening spaces having distinctive markings, some of them representing offices and buildings, railroad transportation, foreign ownership of American soil, wages, land in use and land held out of use, and a series of cards of changeable value, tags representing improvements on the land, money pieces, no trespassing signs, for sale sign, and a cube to be used in combination with the board, said cube having upon its faces symbols to indicate a condition or a move.

5. A game-board, provided with corner spaces, intervening spaces, some of the intervening spaces being identical, in combination with a pack of cards some having changeable value and having relation to more than one board space, tags representing improvements, money pieces, no trespassing signs, for sale signs, checkers to indicate the action of the different players, a pair of dice, and a chance cube to be used with the dice and board, said cube having symbols to indicate a condition or a move.

In testimony whereof I affix my signature.

ELIZABETH MAGIE PHILLIPS.